US012245337B2

(12) United States Patent
Krietzman

(10) Patent No.: US 12,245,337 B2
(45) Date of Patent: Mar. 4, 2025

(54) VAPORIZING CONSUMABLES HEATED WITH CONVECTION AND CONDUCTION IN A PORTABLE DEVICE

(71) Applicant: Mark Krietzman, Palos Verdes Estates, CA (US)

(72) Inventor: Mark Krietzman, Palos Verdes Estates, CA (US)

( * ) Notice: Subject to any disclaimer, the term of this patent is extended or adjusted under 35 U.S.C. 154(b) by 0 days.

(21) Appl. No.: 18/412,194

(22) Filed: Jan. 12, 2024

(65) Prior Publication Data

US 2024/0155738 A1 May 9, 2024

Related U.S. Application Data

(63) Continuation-in-part of application No. 18/133,991, filed on Apr. 12, 2023, now Pat. No. 11,979,949, which is a continuation-in-part of application No. 17/147,030, filed on Jan. 12, 2021, now Pat. No. 11,770,877, which is a continuation of application (Continued)

(51) Int. Cl.

| | |
|---|---|
| ***H05B 1/02*** | (2006.01) |
| ***A24B 15/16*** | (2020.01) |
| ***A24F 40/40*** | (2020.01) |
| ***A24F 40/42*** | (2020.01) |
| ***A24F 40/46*** | (2020.01) |
| ***A24F 40/50*** | (2020.01) |
| ***H05B 3/14*** | (2006.01) |
| ***H05B 3/42*** | (2006.01) |
| *A24F 40/60* | (2020.01) |

(52) U.S. Cl.

CPC ........... *H05B 1/0244* (2013.01); *A24B 15/16* (2013.01); *A24F 40/40* (2020.01); *A24F 40/42* (2020.01); *A24F 40/46* (2020.01); *A24F 40/50* (2020.01); *H05B 1/0225* (2013.01); *H05B 3/146* (2013.01); *H05B 3/42* (2013.01); *A24F 40/60* (2020.01); *H05B 2203/014* (2013.01); *H05B 2203/021* (2013.01); *H05B 2203/022* (2013.01)

(58) Field of Classification Search

CPC ....................................................... A24F 40/42

See application file for complete search history.

(56) References Cited

U.S. PATENT DOCUMENTS

| | | | |
|---|---|---|---|
| 4,947,874 | A | 8/1990 | Brooks et al. |
| 4,947,875 | A | 8/1990 | Brooks et al. |

(Continued)

FOREIGN PATENT DOCUMENTS

| | | |
|---|---|---|
| CN | 1541577 | 11/2004 |
| CN | 101518361 | 9/2009 |

(Continued)

*Primary Examiner* — Ross N Gushi

(74) *Attorney, Agent, or Firm* — Mark H. Krietzman

(57) ABSTRACT

A disposable consumable with tobacco, hemp and/or cannabis therein is heated in a keyed receivor allowing conduction and convection. The consumable when inserted into a heating chamber via a keyed receivor will have one or more linear sections running axially that are in direct contact with the inner wall of the heating chamber and one or more linear sections that are remote from the inner wall with a volume of air between the cartridge and inner wall. Direct contact sections are heated via conduction through the heating chamber wall and the heated air volume forms a convection airflow for inhalation.

4 Claims, 13 Drawing Sheets

Related U.S. Application Data

No. 16/410,858, filed on May 13, 2019, now Pat. No. 10,893,707, which is a continuation-in-part of application No. 15/898,629, filed on Feb. 18, 2018, now Pat. No. 10,299,515, which is a continuation-in-part of application No. 15/045,442, filed on Feb. 17, 2016, now Pat. No. 9,894,936, said application No. 18/133,991 is a continuation-in-part of application No. 17/211,721, filed on Mar. 24, 2021, now Pat. No. 11,647,566, which is a continuation-in-part of application No. 16/118,244, filed on Aug. 30, 2018, now Pat. No. 10,986,872, which is a continuation of application No. 15/045,410, filed on Feb. 17, 2016, now Pat. No. 10,076,137.

(60) Provisional application No. 62/116,926, filed on Feb. 17, 2015, provisional application No. 62/127,817, filed on Mar. 3, 2015, provisional application No. 62/184,396, filed on Jun. 25, 2015, provisional application No. 62/208,786, filed on Aug. 23, 2015, provisional application No. 62/270,557, filed on Dec. 21, 2015, provisional application No. 62/551,234, filed on Aug. 29, 2017.

(56) References Cited

U.S. PATENT DOCUMENTS

| | | | | |
|---|---|---|---|---|
| 5,144,962 | A | 9/1992 | Counts et al. | |
| 5,269,327 | A | 12/1993 | Counts et al. | |
| 5,388,594 | A | 2/1995 | Counts et al. | |
| 5,530,225 | A | 6/1996 | Hajaligol | |
| 5,649,554 | A | 7/1997 | Sprinkel et al. | |
| 5,692,525 | A | 12/1997 | Counts et al. | |
| 5,708,258 | A | 1/1998 | Counts et al. | |
| 5,954,979 | A | 9/1999 | Counts et al. | |
| 6,155,268 | A | 12/2000 | Takeuchi | |
| 6,516,796 | B1 | 2/2003 | Cox et al. | |
| 7,185,659 | B2 | 3/2007 | Sharpe | |
| 9,032,968 | B2 | 5/2015 | Glasberg et al. | |
| 9,084,440 | B2 | 7/2015 | Zuber et al. | |
| 9,259,035 | B2 | 2/2016 | Terry et al. | |
| 9,271,526 | B2 | 3/2016 | Liu | |
| 9,414,629 | B2 | 8/2016 | Egoyants et al. | |
| 9,451,791 | B2 | 9/2016 | Sears | |
| 9,510,623 | B2 | 12/2016 | Tucker et al. | |
| 9,516,899 | B2 | 12/2016 | Plojoux et al. | |
| 9,532,603 | B2 | 1/2017 | Plojoux et al. | |
| 9,609,894 | B2 | 4/2017 | Abramov et al. | |
| 9,675,117 | B2 | 6/2017 | Li et al. | |
| 9,775,380 | B2 | 10/2017 | Fernando et al. | |
| 9,826,780 | B2 | 11/2017 | Krietzman | |
| 9,854,841 | B2 | 1/2018 | Ampolini et al. | |
| 10,076,137 | B2 | 9/2018 | Krietzman | |
| 10,130,780 | B2 | 11/2018 | Talon | |
| 10,238,764 | B2 | 3/2019 | Trzecieski | |
| 10,299,515 | B2 | 5/2019 | Krietzman | |
| 10,785,198 | B2 | 9/2020 | Pahl et al. | |
| 10,885,734 | B2 | 1/2021 | Schoenfelder et al. | |
| 10,982,899 | B1 | 4/2021 | Gelardi | |
| 10,986,872 | B2 * | 4/2021 | Krietzman | A24F 40/42 |
| 11,007,546 | B2 | 5/2021 | Hohmann et al. | |
| 11,033,056 | B2 | 6/2021 | Gill et al. | |
| 11,457,667 | B2 | 10/2022 | Krietzman | |
| 2002/0179179 | A1 | 12/2002 | Volpenheim et al. | |
| 2004/0089314 | A1 | 5/2004 | Felter et al. | |
| 2007/0074734 | A1 | 4/2007 | Braunshteyn et al. | |
| 2013/0218066 | A1 | 8/2013 | Duquet et al. | |
| 2014/0014124 | A1 | 1/2014 | Glasberg et al. | |
| 2014/0097207 | A1 | 4/2014 | Szymiczek et al. | |
| 2014/0202476 | A1 | 7/2014 | Egoyants et al. | |
| 2014/0366898 | A1 | 12/2014 | Monsees et al. | |
| 2015/0040929 | A1 | 2/2015 | Hon | |
| 2015/0150308 | A1 | 6/2015 | Monsees et al. | |
| 2015/0284177 | A1 | 10/2015 | Patil et al. | |
| 2015/0305406 | A1 | 10/2015 | Li et al. | |
| 2015/0306617 | A1 | 10/2015 | Olegnowicz | |
| 2015/0342257 | A1 | 12/2015 | Chen | |
| 2016/0198771 | A1 | 7/2016 | Goggin et al. | |
| 2016/0235124 | A1 | 8/2016 | Krietzman | |
| 2016/0255879 | A1 | 9/2016 | Paprocki et al. | |
| 2016/0278436 | A1 | 9/2016 | Verleur et al. | |
| 2016/0331033 | A1 | 11/2016 | Hopps et al. | |
| 2017/0108210 | A1 | 4/2017 | Meinhart et al. | |
| 2017/0119051 | A1 | 5/2017 | Blandino et al. | |
| 2017/0156407 | A1 | 6/2017 | Abramov et al. | |
| 2017/0215478 | A1 | 8/2017 | Harrison et al. | |
| 2017/0360092 | A1 | 12/2017 | Althorpe et al. | |
| 2018/0030974 | A1 | 2/2018 | Cosgarea | |
| 2018/0085551 | A1 | 3/2018 | Krietzman | |
| 2018/0140001 | A1 | 5/2018 | Gabbay | |
| 2019/0195852 | A1 | 6/2019 | Bryant, Jr. et al. | |
| 2019/0373679 | A1 | 12/2019 | Fu et al. | |
| 2020/0138117 | A1 | 5/2020 | Rosser et al. | |
| 2020/0156826 | A1 | 5/2020 | Kilduff et al. | |
| 2020/0377280 | A1 | 12/2020 | Pace et al. | |
| 2021/0346616 | A1 | 11/2021 | Krietzman | |
| 2021/0401061 | A1 | 12/2021 | Davis et al. | |
| 2023/0232886 | A1 | 7/2023 | Robinson et al. | |

FOREIGN PATENT DOCUMENTS

| | | |
|---|---|---|
| CN | 101606758 | 12/2009 |
| CN | 201379072 | 1/2010 |
| CN | 204393344 | 6/2015 |
| JP | 3164992 | 12/2010 |

* cited by examiner 1
2
HAF
3
500
battery 25
23A
24
305
211
110
AHZ
23
34
40
207
"B"
"A"
30/32
27
200

23
1
AHZ
200
500
211
27
CHZ

CHZ
1
23
207
500
200
211
27
40
RA

VAPORIZING CONSUMABLES HEATED WITH CONVECTION AND CONDUCTION IN A PORTABLE DEVICE

RELATED APPLICATIONS

This application is a continuation of U.S. patent application Ser. No. 18/133,991 filed Apr. 12, 2023 and entitled "PORTABLE MULTIZONE INDUCTION VAPORIZER FOR TOBACCO CONSUMABLES" which is a continuation of U.S. patent application Ser. No. 17/147,030, filed Jan. 12, 2021, and entitled "PORTABLE TEMPERATURE CONTROLLED AROMATHERAPY VAPORIZERS" which is a continuation of U.S. Pat. No. 10,893,707, filed May 13, 2019 entitled "Portable Temperature Controlled Aromatherapy Vaporizers" which is a continuation of U.S. Pat. No. 10,299,515, filed Feb. 18, 2018 entitled "Dynamic Zoned Vaporizer" which is a continuation in part of U.S. Pat. No. 9,894,936, filed Feb. 16, 2016 and entitled "Zoned Vaporizer" U.S. Pat. No. 9,894,936 which claims the benefit of U.S. Provisional Pat. Application Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein. This application is also continuation of U.S. patent application Ser. No. 17/211,721, filed Mar. 24, 2021, and entitled "VAPORIZERS WITH CARTRIDGES WITH OPEN SIDED CHAMBER" which is a continuation of U.S. Pat. No. 10,986,872, filed Aug. 30, 2018 entitled "VAPORIZER AND VAPORIZER CARTRIDGES" which is a continuation of U.S. Pat. No. 10,076,137, filed Feb. 17, 2016 entitled "VAPORIZER AND VAPORIZER CARTRIDGES" which claims the benefit of U.S. Provisional Pat. Application Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

BACKGROUND OF THE DISCLOSURE

Field of the Disclosure

The present disclosure relates generally to non-combustible disposable cartridges which can heat without burning vaporizable oils, compounds and/or other plant-based material such as tobacco, hemp and cannabis. More specifically, to key guide or keyhole positioning of a disposable consumable within a heating chamber wherein the plant-based material is heated by one or more of conduction and convection.

Related Art

Cannabis, hemp, tobacco and other botanicals have been known in the art to be vaporized or burned to release organic material in the form of inhalable material. Vaporizing at correct temperatures can boil off the oils for inhalation without combusting the plant material.

Vaporization allows aromatherapy or inhalation. Herbs and botanicals have been known in the art to be vaporized or burned to release organic material in the form of inhalable material.

Lavender vaporizes at 260° F. Tobacco vaporizes between 257° F. to over 392° F. Green tea vaporizes between about 175° C. to over 185° C. Valerian vaporizes at about 235° C. Chamomile used to aid in the relief of anxiety vaporizes at about 380° F. Peppermint vaporizes at about 255° F. Peppermint is also known to ease symptoms of allergies and asthma, in addition to alleviating some of the side effects that come along with the common cold or a sinus infection. Cannabis, has a range at which it can be heated to release different cannabinoids as vapor without burning the organic material from below 200 F to about 430 F.

Heating a cartridge configured to contain organic plant material and/or infused oils on a carrier material may, in some instances, overheat at least portions thereof and therefore combust, overheat or otherwise release unwanted substance which may include carcinogens and chemicals into the vapor.

Uneven heating of a consumable in a heating chamber can result in uneven use of the consumable, charring and in some instances combustion.

It is therefore a desideratum to have a device, method and or system wherein such heating avoids combustion and/or uneven heating.

DESCRIPTION

A method, system and device is disclosed which can heat not burn plant material such as tobacco in a disposable cartridge through a fluid pathway.

A disposable consumable with tobacco, hemp and/or cannabis is heated in a keyed receivor allowing conduction and convection. The consumable when placed in a heating chamber with keyed receivor that indent or compress sections of the consumable with plant material therein. At least one of the indented or non-indented sections is in direct physical contact with the heating chamber inner wall and positioned with sections of the consumable in physical contact with the heating chamber interior wall and at least one of the indented or non-indented sections is remote from direct physical contact with the heating chamber inner with a volume of air between said indent or non-indented and the inner wall. Direct contact sections are heated by conduction through the heating chamber and the heated air volume forms a convection airflow.

Disclosed herein are aspects of devices, systems and methods heating plant material such as tobacco or hemp without combustion including a heating chamber having an open end, a key portion and an inner wall configured to transfer heat therethrough. Inserted therein is a cylindrical consumable cartridge with an inhalation end, and containment end having plant material which is configured to be inserted into the heating chamber and upon insertion sections of the cartridge indent in the key portion. In cross section indented portions of the cartridge are in physical contact with the inner wall and non-indented sections are separated from the inner wall. During use a volume of air between the inner wall and the non-indented section is heated by heat transfer from one or more heating elements via the inner wall and, during use indented sections are heated by conductive heat transfer from one or more heating elements via the inner wall.

In some instances one or more heating elements surrounding at least a portion of the heating chamber and, a controller controls power supplied to the one or more heating elements. In some instances one or more conductive layers at the containment end. In some instances at least one temperature sensor in thermal communication with the heating chamber is in signal communication with the control and the control utilizes input from said temperature sensor to maintain a selected exposure temperature (SET) in the heating chamber. In some instances inhalation on the inhalation end draws at least the volume of heated air in the heating chamber through the cartridge from containment end to inhalation end. In some instances the key portion rotation of the consumable cartridge around its axis. In some instances the heating elements are vertical heaters. In some instances vertical heaters are configured to be positioned near one of indented sections or non-indented sections. In some instances wherein the material is at least one of hemp, cannabis and tobacco. In some instances insulation around at least a portion of the heating elements.

Disclosed herein are aspects of devices, systems and methods heating plant material such as tobacco or hemp without combustion including a heating chamber having an open end, a Key Hole and an inner wall configured to transfer heat therethrough. Inserted therein is a cylindrical consumable cartridge with an inhalation end, and containment end having plant material configured to be inserted into the heating chamber and upon insertion sections of the cartridge indent in the Key Hole. In cross section non-indented portions of the cartridge are in physical contact with the inner wall and indented sections are separated from the inner wall. During use a volume of air between the inner wall and the indented section is heated by heat transfer from one or more heating elements via the inner wall and during use undented sections are heated by conductive heat transfer from one or more heating elements via the inner wall.

In some instances one or more heating elements surrounding at least a portion of the heating chamber and, a controller controls power supplied to the one or more heating elements. In some instances one or more conductive layers at the containment end. In some instances at least one temperature sensor in thermal communication with the heating chamber is in signal communication with the control and the control utilizes input from said temperature sensor to maintain a selected exposure temperature (SET) in the heating chamber. In some instances inhalation on the inhalation end draws at least the volume of heated air in the heating chamber through the cartridge from containment end to inhalation end. In some instances the key portion rotation of the consumable cartridge around its axis. In some instances the heating elements are vertical heaters. In some instances vertical heaters are configured to be positioned near one of indented sections or non-indented sections. In some instances the material is at least one of hemp, cannabis and tobacco. In some instances insulation around at least a portion of the heating elements.

DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

Figure 2:
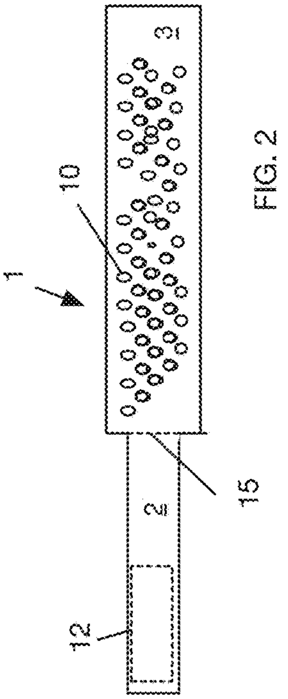
FIGS. 1-4 illustrate aspects of cartridge modules and associated heater.
Figure 1:
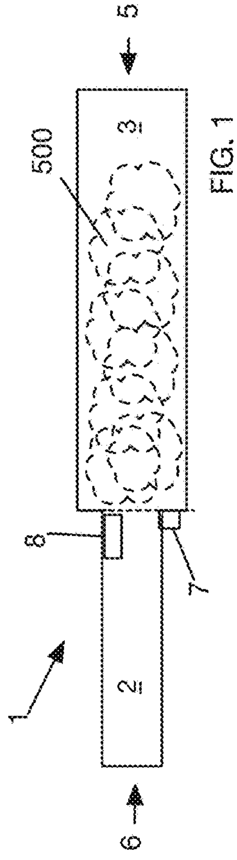
Figure 3:
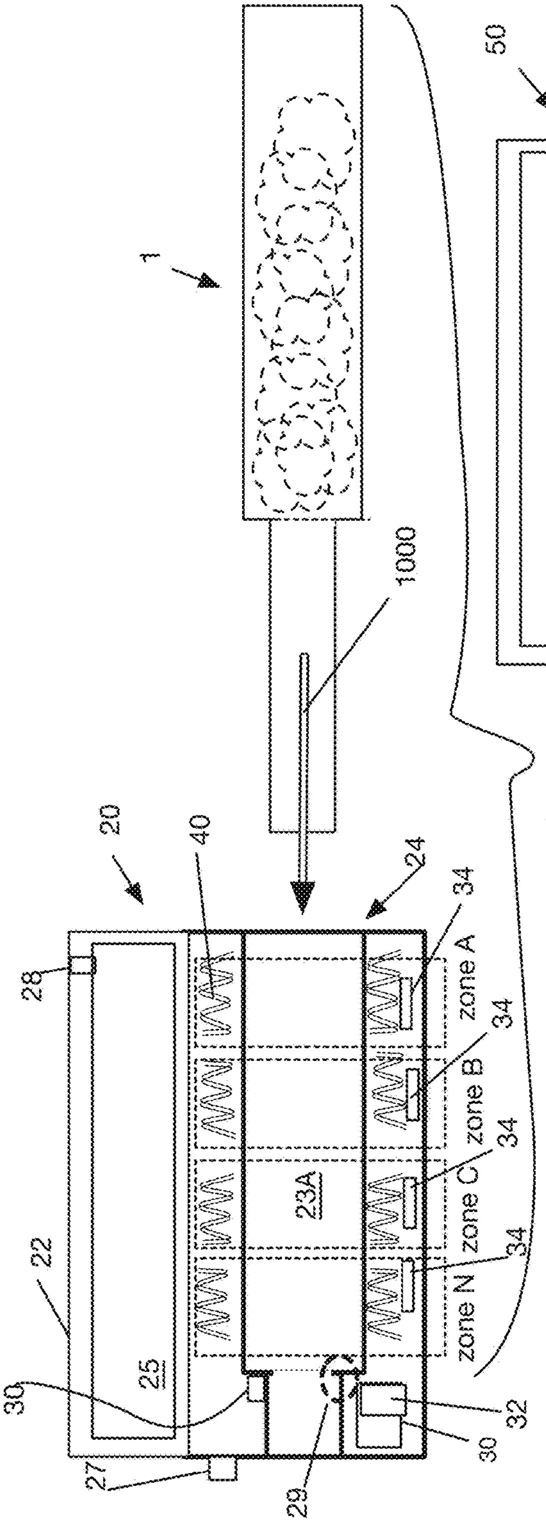
Figure 4:
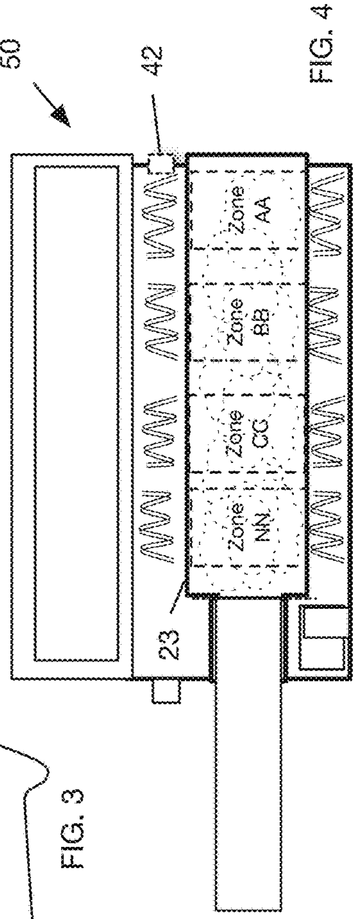

All descriptions and callouts in the Figures and all content therein are hereby incorporated by this reference as if fully set forth herein.

BRIEF DESCRIPTION

A modular vaporizer which eliminates one or more of fouling, mess, resin build up, debris build-up and performance reducing impact of same is disclosed herein.

Vaporizing plant material for inhalation of plant borne chemicals is considered by some to be less harmful than combusting the plant material. Tobacco, hemp and cannabis are examples of such material.

The instant disclosure teaches a disposable inhalation cartridge and a heater base wherein the cartridge contains the organic material to be vaporized and the heater system is zoned.

It is appreciated by those skilled in the art that some of the circuits, components, controllers, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs*), time-to-frequency conversations, frequency-to-time conversions, database mapping, signal processing steps, coding, modulations, demodulations, etc. The controller devices and smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

Heating logic turns on/off heating elements forming zones to heat different sections of the cartridge at different times. In some instances the cartridge has limited orientations of insertion to hold it fixed in the heater and unable to rotate about its axis. In some instances the cartridge is marked with a frangible identifier which is broken on insertion to prevent reuse of a spent cartridge. In some instances the cartridge is marked with an identifier that is stored in memory to turn off the heater if the cartridge has already been used. In some instances positioning sensor(s) input to the controller if a consumable cartridge has been inserted or removed from the heating system.

FIGS. 1, 2, 3 and 4 show elongated circular cartridge 1 with two ends, the first end 2 is an inhalation (or intake) end or portion and the second end 3 is a containment (or heating) end or portion. During use air pass into the open front 5 to the containment end 3 and then into the inhalation end 2 and finally out through the open back 6. Optionally, a frangible section 7 may be formed on the cartridge whereby it will be deformed on use with a heater and render the cartridge finished an unable to be reused. In some instance an ID 8 which verifies cartridges non-used status may be added to the cartridge. In some instances small perforations 10 may be formed in the containment end 3 to effectuate better heat flow from heating elements. In some instances a filter or flavor filter 12 is placed in the inhalation end 2 whereby vapor inhaled passes. The filter can remove some materials from the vapor and the flavor filter adds an inhalable flavor to the vapor. A flow through divider 15 such as a screen or coarse filter which allows vapors to pass through may be positioned in the cartridge between the containment and inhalation ends. Organic matter 500 is placed in the containment 3 for use of the cartridge. The organic material is a material containing oils or resins (such as, hemp, tobacco and cannabis) which can be released via heating.

The cartridge is formed of an inexpensive disposable material which will not burn or release toxic or harmful fumes at temperatures that are reached by the heater in the device. In generally for many organic materials the temperature of vaporization will be between 320 F to 420 F. The cartridge may be scarred by the heating process as it is disposable. Paper, fibers such as cotton and hemp, metal, foil plastic, resins, thermoplastics, ceramics, ceramic doped paper, glass, PEEK, and combination which may form layers thereof are suitable material for some or all of the cartridge. The cartridge maybe made of different materials for different regions, layers or areas. For example the containment portion 3 is subjected to the greatest heat and materials that facilitate transfer heat such as having properties of thermal conductivity can be used. The material or materials therein must be suitable to transfer a sufficient portion of the heat applied to its surface through its wall and into the containment portion to thereby cause vapor of the organic material 500 without burning. In some instances the interior annular wall of the containment portion has one or more conductive regions or layers facing the inside.

During use the cartridge 1 is inserted in a heater 20 via the pathway of arrow 1000. This also may be referred to as a pass-through cartridge device. The example of the passing the cartridge through the heater is not a limitation and those of ordinary skill in the art will recognize that a non-pass-through configuration is within the scope of this disclosure. The heater 20 has a case 22 with an interface 24 to a receivor 23. The receivor also referred to as a cartridge guide or heating chamber The receivor 23 is a channel within the case which is configured for entry and removal of a cartridge. The receivor both holds a cartridge and can be configured for thermal communication to transfer heat from a heater or heaters outside the receivor to the interior annular wall 23A of the receivor which is in thermal communication with a heater system whereby heat form the heating system can be provided to the containment end 3 holding material to vaporize. Accordingly, plant material in a cartridge placed in a receivor can be heated through the wall of the receivor and the wall of the cartridge.

Within the case is a battery 25. A cartridge identification reader 26 may also be added to the case. The identification reader is a sensor that verifies a cartridge is new and has not been previously used. It may determine that a heat indicator has previously been heated, it may determine that a code which is ablated by the heat of use his or is not present thereby interrupting or allowing heating. It may read a code and verify that the code has not been used during a prescribed interval. An on/off switch 27 is shown, and battery may have a charging I/O 28. The case may have a mechanical or electrical mechanical actuator 29 that is activated by a cartridges frangible section 7 and also deforms, or breaks said frangible section upon actuation. Actuation is the communication of the actuator 29 to the controller whereby the controller recognizes the cartridge as "new" and not used and thereby allows electrical current to flow to the heating elements. Within the case is a controller 30. The controller is a microprocessor which may have memory 32 and which controls certain operations of the vaporizer device. Operations may include one or more of time, date, location, security code, on/off, sequence of heating, temperature, indicator display of the heater, battery charging, battery management, battery state of charge indication, cartridge verification. Those of ordinary skill in the art will recognize that blue tooth or other wireless or wired connection to a smart phone or computer may also be used to perform some of the controller functions and that would be within the scope of this disclosure. One or more temperature sensors 34 are within the case and near the receivor 23.

The case 22 contains one or more heating elements 40A-N. One or more heater vents 42 may be provided. Although four heating elements are shown those of ordinary skill in the art will understand that what is disclosed is one or more zones. In some instance only a single heating zone may be provided, in other instances multiple zones may be utilized and such is within the scope of this disclosure.

In some exemplary implementations a multi-zone heater is disclosed it may have heat zone "A" to zone "N". A cartridge, during use, will have corresponding zones "AA" to "NN" which align generally with the heat zones.

During use one or more zones may be turned on to supply heat, via heating elements, to heat organic material 500 and release vapor. Sequencing the zones for heating is advantageous in that it can reduce power consumption. Sequencing the zones for heating is advantageous in that it can release vapor from a discreet amount of organic material at one time thereby leaving unheated areas of organic material with the same cartridge for a next use. Sequential heating also reduces overheating and supports continuous use while reducing over heating which for at least cannabis results in singeing the material which is commonly referred to as a "popcorn" taste.

Figure 5B:
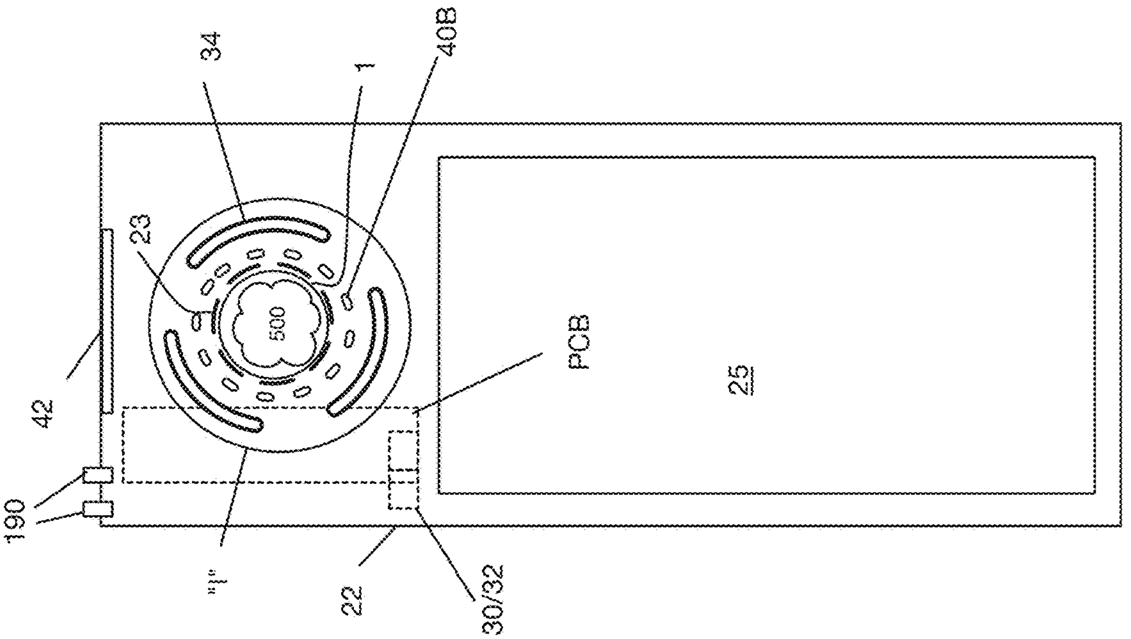
FIGS. 5A-5B illustrate aspects of cartridge modules and associated heater with multi-zone heating configuration.
Figure 5A:
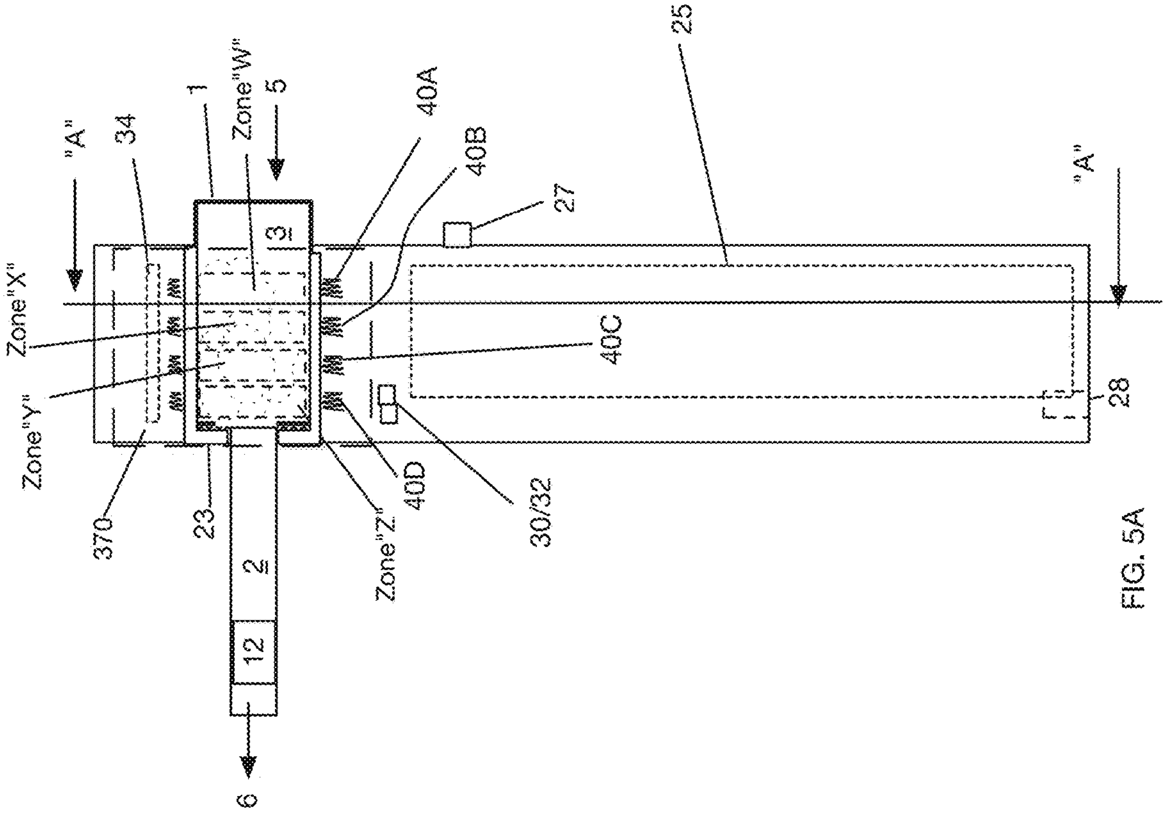

FIGS. 5A-5B show an alternative package for the systems shown in FIGS. 1-4. This disclosure heats the cartridge 1 akin to slicing a sausage. Each of zones "W"-"Z" are sequentially heated. The controller keeps count of which was the last zone to be heated. The controller keeps count of when all zones have been heated and can stop the heat cycle until a spent cartridge is removed and replaced with a new cartridge. It also adds indicators 190. Indicators are shown as LED lights. Indicators are illumination used to communicate status of the device to a user. The communication may be of a spent cartridge, a spent zone that has been heated, the remaining zones to heat, a need for recharge, or remaining zones to heat. Heating elements 40A-4D are in thermal contact with heat zones "W"-"Z". One or more temperature sensors 34 are within the case and near the receivor 23, each temperature sensor is associate with at least one of a heat zone and heating element. Insulation "370" may be placed around the heater elements inside the case 22. The heater elements may optionally be connected to a PCB board via conductive wires and the controller and memory may also be on that board. The battery 25 is connected via the on/off switch 27 to the controller 30 to supply power to the heat elements. The controller 30 may be connected to separate digital memory 32. The controller initiates each heater element (40A-40D) sequentially to spend each zone and then use the next. When the sequence is complete the device stops heating until reset. All aspects of systems to verify, authenticate and assure that a used cartridge is not reloaded into the device, as described herein with respect to other exemplars are hereby incorporated into this description with respect to FIGS. 5A and 5B.

The cartridge mates with the receivor 23 which places it adjacent to heating elements. The cartridge heating portion (containment) should be constructed so that it does not burn, or combust at exposure temperatures below at least one of 400 degrees F., 410 degrees F., 420 degrees F., 430 degrees F., and 440 degrees F. The failure to burn or combust occurring after at least one of 30 seconds exposure, 1 minute exposure, 2 minute exposure. The failure to burn or combust occurring after at three least 30 second exposures. The failure to burn or combust occurring after at three least 1 minute exposures. The failure to burn or combust occurring after at least four 1 minute's exposures. The failure to burn or combust occurring after at five least 1 minute exposures. The failure to burn or combust occurring after at seven least 1 minute exposures. The failure to burn or combust occurring after at eight least 1 minute exposures.

Figure 6B:
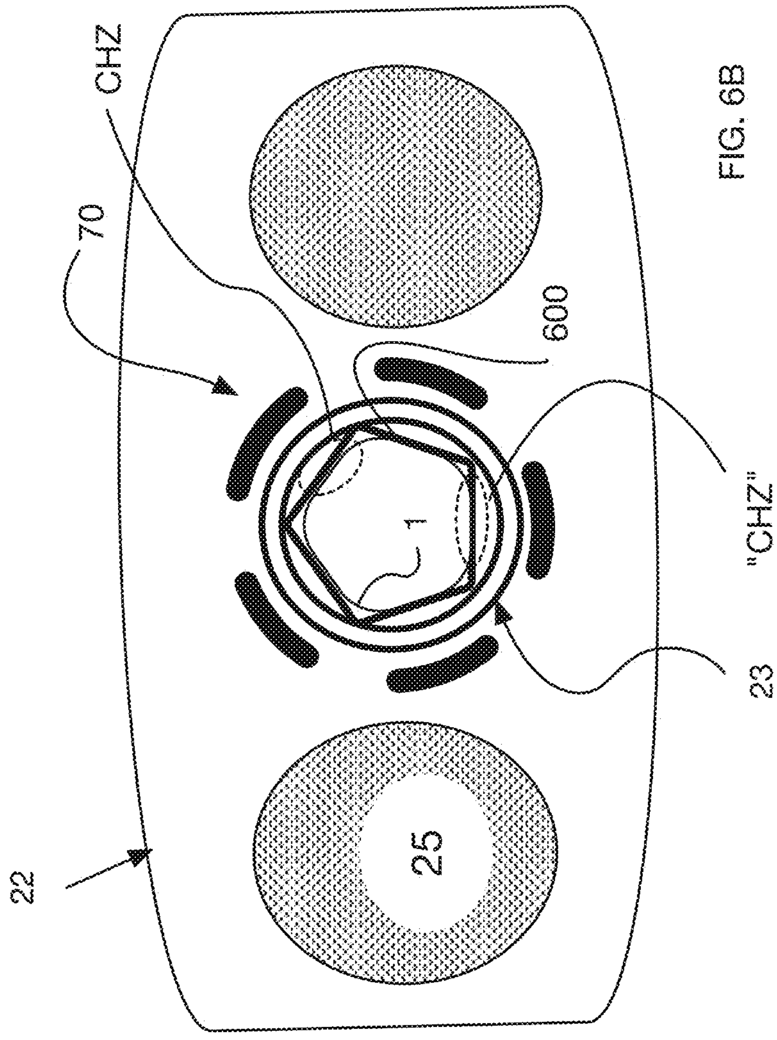
FIGS. 6A-6H illustrate aspects of a cartridge heating system with heating chamber key portion.
Figure 6A:
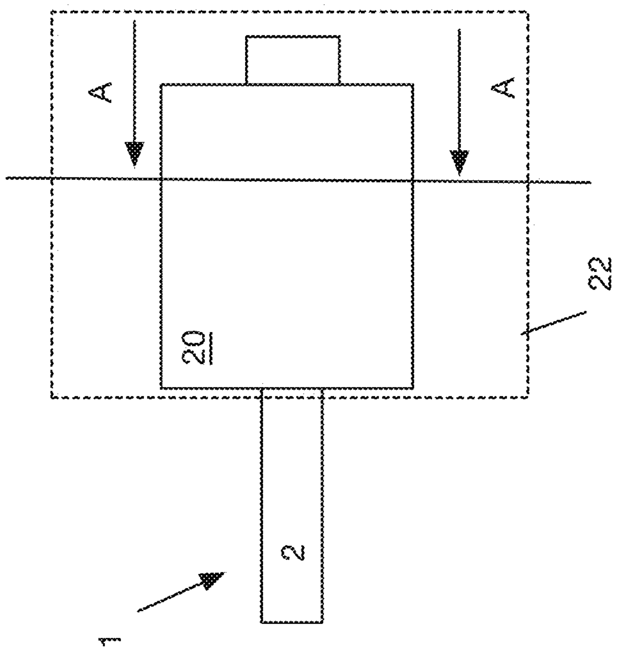

FIGS. 6A-6G shows aspects of another exemplary implementation of the cartridge and heater device. A heater 20 in a case 22 heats a disposable cartridge 1. FIG. 6B is a cut-away view from line "A-A" of FIG. 6A, it shows a receivor 23 and a key portion 600. One or more heating elements are shown. Said heating elements may be a series of vertical heating elements 70 (also referred to as an array). Said vertical heating elements are each aligned with a specific region of the heating chamber in an axial direction. In some instances the heater 20 is one or more heating elements encircle at least a part of the receivor (heating chamber) a previously described. The controller supplies power to each one or more heater element in response to temperature sensor data. In some instances the heating may be sequential the turning on/off of a heating element is controlled by the controller. The controller can also receive temperature sensor data to turn one or more heating elements or to maintain a set exposure temperature. The controller can turn on one of the heating elements thereby directing the heat to one heating zone. Memory either volatile or non-volatile will store data on system parameters when the controller is not powered. The controller instructs the on/off of heating elements within the heating array.

The disposable elongated cylindrical cartridges should be thin walled to effect heat transfer and malleable whereby its shape can be altered cross sectionally be pressure applied to it such as passing it over a key. The key portion 600 reshapes sections of the cartridge by forming indentations in the cylindrical cartridge. The key portion limits cartridge rotation about its axis when in the receivor Limiting rotation of the consumable cartridge around its axis in the receivor aligns or places one or more predefined sections of the containment end second shaped end against regions of the receivor inner wall in predetermined locations. In some instances vertical heating elements can be aligned with the controller keeps count of which was the last zone to be heated.

Those of ordinary skill in the art will recognize that the illustration of the key portion as a pentagon shape is not a limitation and that any non-circular portion in the receivor (heating chamber) including but not limited to polygonal shapes and complex curves with indents and protrusions as part of the inner wall of the receivor (heating chamber). Conductive Heat Zones "CHZ" are regions wherein the shaped section(s) of the cartridge containment end are placed in predefined locations in direct physical contact with the receivor interior wall 23A. Conductive Heat Zones ("CHZ") are configured for conduction of heat from one or more heaters through the wall of the receivor to the one or more sections of the cartridge in physical contact with the interior receivor wall. Viewed axially, at least the cartridge containment within the receivor (heating chamber) will have section in physical contact with the receivor and sections separated from the receivor wall by air gaps.

Figure 6C:
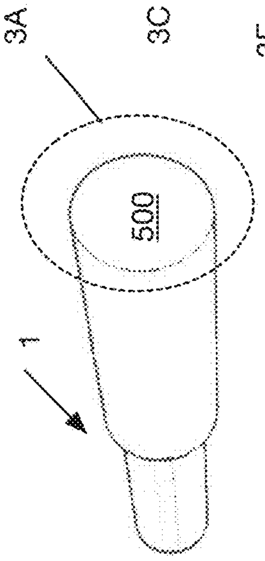
Figure 6D:
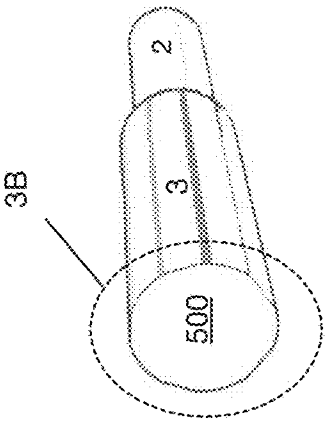
Figure 6E:
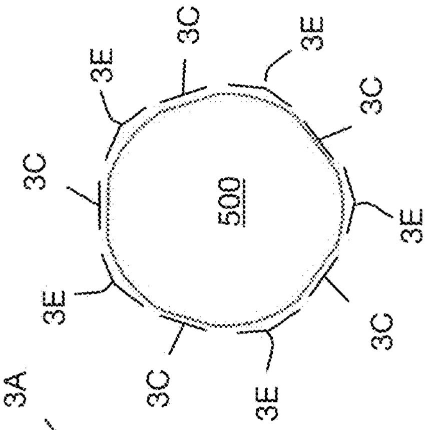

FIGS. 6C-6E shows a disposable consumable cartridge before and after insertion into the heater heating chamber (receivor) 23. Before insertion the containment end 3 has a circular first shape 3A. After insertion the containment end has a noncircular second shape 3B. FIG. 6E shows a cross section of the containment end after insertion into the heating chamber and key portion 600. As the key portion illustrated is pentagonal, after insertion of the containment end through the heating chamber key portion five flattened (or indented) sections 3C of the cartridge containment end are seen. Material 500 in the containment end will be compressed by the shaping.

Figure 6F:
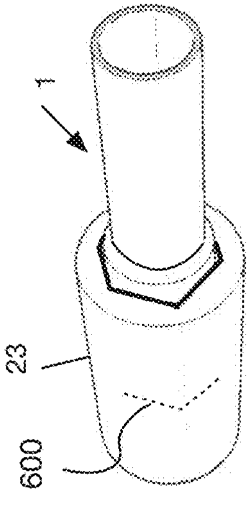
Figure 6G:
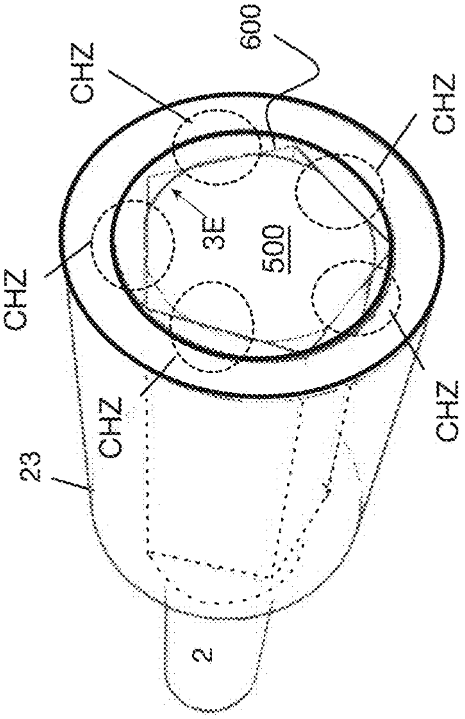
Figure 6H:
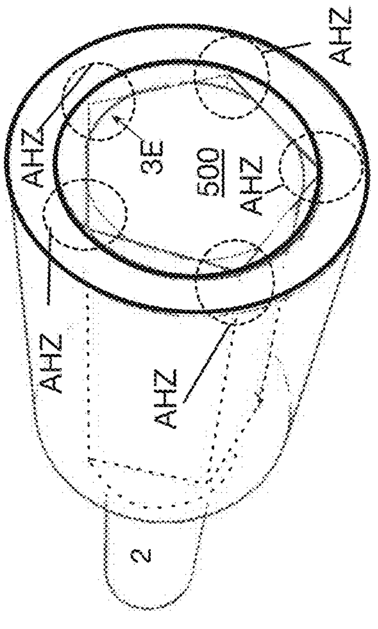

FIGS. 6F, 6G and 6H show front and back perspective views of the cartridge in the receivor and the key. CHZs are called out where the cartridge contacts with the inner annular wall 23A. Other non-indented or unflatten sections 3E of the containment end are spaced apart from (not in physical contact with) the receivor's inner annular wall 23A forming Air Heating Zones "AHZ". During use, the air in the AHZs is heated. Passing the cylindrical cartridge into the key portion of the receivor reshapes the cartridge section that passes therethrough. During use the sections of the shaped containment end 3B which are in physical contact with the inner annular wall are conduction heated and sections remote from the inner wall form volumes of air in the AHZ. In some instance vertical heater positioning corresponds to the key portions which are configured to indent the cartridge containment end to form CHZs. In some instance vertical heater positioning corresponds to the key portions which are configured to form AHZs. In some instance vertical heater positioning corresponds to the key portions which are configured to form one or more CHZs and one or more AHZs. The key portion prevents cartridge rotation about its axis when in the receivor (heating chamber). Limiting rotation of the consumable cartridge around its axis in the receivor aligns or places one or more predefined sections of the containment end second shaped end against regions of the receivor inner wall in predetermined locations. The controller counts and/or controls heating of each vertical heater such that each vertical heater is controlled. In some instance the heater(s) corresponding to one or more CHZ are activated, in other instance the vertical heater(s) corresponding to one or more AHZ are activated. In other instances a combination of vertical heaters corresponding to CHZ and AHZ are activated. In other instances selection of heating element materials to generate more heat in a particular area and/or arraying a group of heating filaments to have a denser region of filaments to provide more heat per unit area near a predetermined area is disclosed. In other instances, using dissimilar heating filaments with the ones corresponding to the predetermined area being less conductive and/or providing less heat per unit area. The heating element is configured to providing different heat per unit area around the receivor.

Figures 7A, 7B, 7C:
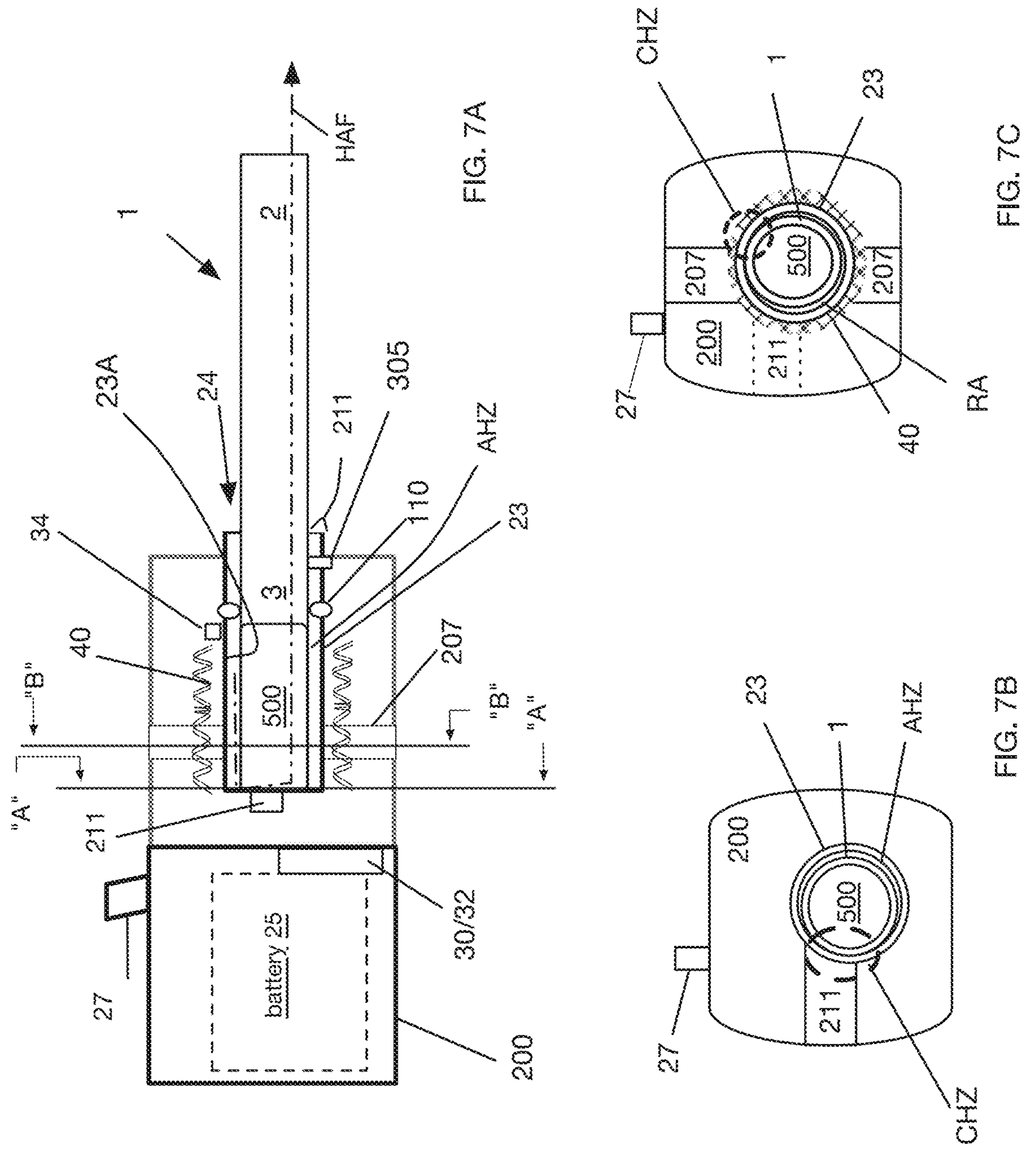
FIGS. 7A-7C illustrate aspects of a disposable cartridge and heating chamber.

FIGS. 7A-7C show a non-pass through cartridge heating system, the cartridge distal end is kept in the receivor by the receivor. A case 200 contains the one or more heating elements 40. Heating elements include a coil wire, Kapton™ (polyimide) or silicone tape with metalized flat elements, iron-chromium-aluminum (FeCrAl) alloys, nichrome (nickel chrome alloy) wires, filaments or any material which does not outgas at the desired temperatures, are located around the outside annular wall of the receivor 23 (heating chamber). The cartridge fits into the case 200 via a cartridge interface 24 which is, part of and/or fluidly connected to the receivor 23. Said receivor is both a guide for accepting a cartridge and heating chamber. Upon insertion of the containment end 3 (which is also referred to as distal end) of the cartridge into the heating chamber (also referred to as a receivor) 23. Said receivor is configured to be in thermal communication with heat element(s) surrounding at least part of the receivor. Said thermal communication refers to the transfer of heat provided by one or more heating elements through the heating chamber wall. The cartridge 1 is removable from the case. The inhalation end 2 (also referred to as the proximal end) is extended from the case. The receivor 23 may have seals 110 to form a better closure between receivor and cartridge. An organic plant material 500 for vaporization is within the distal end near the one or more heating elements 40. A positional sensor 305 can provide input to the controller to decision if a cartridge is in the receivor. Said controller uses such data to control the timing and amount of power provided to the one or more heating elements.

During use, a volume of air in the receivor in an Air Heating Zone "AHZ" between the inner wall 23A and at least the cartridge is heated when heating element(s) heat the inner wall 23A of the receivor and the cartridge inside the receivor. The volume of heated air will flow during inhalation on the inhalation end forming a convection air flow also referred to as a Heated Airflow "HAF" which is drawn from the distal end of the consumable cartridge distal end (containment) 3 to and through the proximal end 2. One or more vents 207 allow the heater to vent from the case. At least one air intake 211 provides a fluid pathway for additional air to enter the case and be drawn through the cartridge from distal end to proximal end and then out for inhalation. The sections of the cartridge containment end in physical contact with the inner wall 23A are Conductive Heat Zones "CHZ" and also heat the material therein by conduction. FIG. 7B shows a cut away view of the device along the line of A-A and FIG. 7C shows a cut-away of the device along the lines of "B-B".

Figure 8:
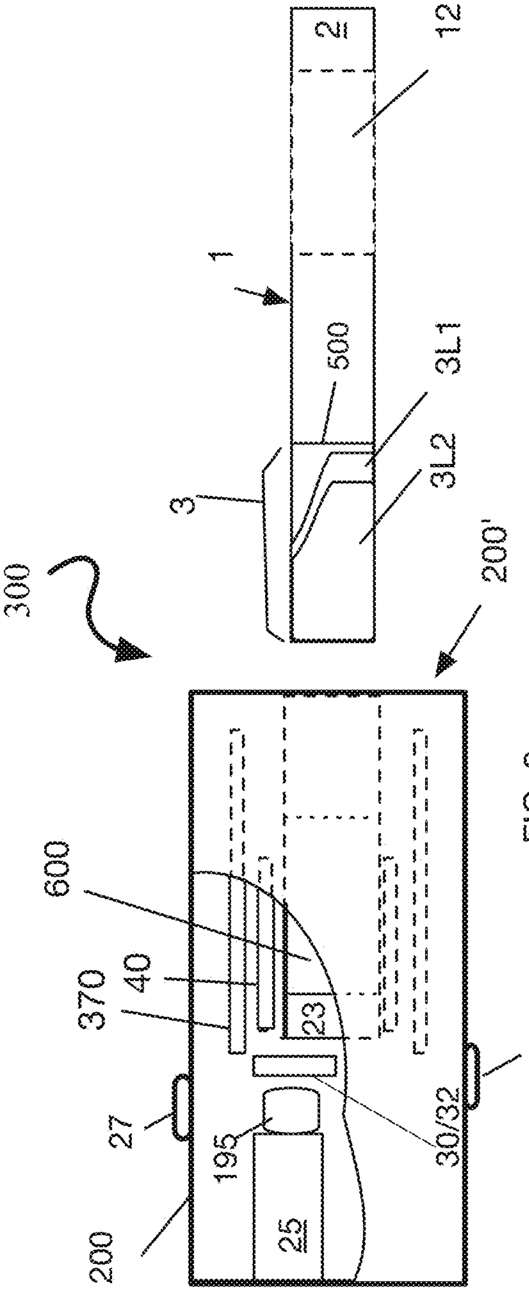
FIG. 8 illustrates aspects of a cartridge and key portion heating chamber.

FIG. 8 shows a component overview of a consumable and heating system 300 with a key portion and heating chamber or receivor. The case 200 described above includes but is not limited to heating element(s), controller, temperature sensor (s) 34, power supply, illumination (communication) PCB, switches, and memory and all electronics placing the heating element(s) under the control of the controller which is configured to produce measured heat to a defined level. Said defined level may be fixed or variable. A communication display such as illumination via an electroluminescent screen, light emitting diode (LED) indicators 190 or a liquid crystal display may be added. It is also within the scope of the disclosure that communication with user may be via sound, or a vibration controlled by the controller. Said vibration producing means 195 include but are not limited to a DC motor or piezoelectric devices.

The cartridge 1 is an elongated cylindrical tube with a proximal end 2 for inhalation, which also may have a filter or added flavor 12 therein and a containment end 3 which contains plant material to be vaporized. The cartridge is formed of an inexpensive disposable material which will not burn or release toxic or harmful fumes at temperatures that are reached in the device. The cartridge may be scarred by the heating process as it is disposable. Paper, fibers such as cotton and hemp, metal, foil, plastic, resins, thermoplastics, ceramics, ceramic doped paper, glass, PEEK, and combination thereof may be suitable material for some or all of the cartridge. The cartridge maybe made of different materials for different regions. For example the containment portion 3 is subjected to the greatest heat. The material must be suitable to transfer a sufficient portion of the heat applied to its surface through its wall and into the containment portion to thereby cause vapor release from the organic material 500. In some instances the containment end has more than one layer including at least a conductive layer 3L1 containing metal, foil or other material which facilitates heat transfer and an outer layer 3L2.

In use, the consumable cartridge's containment end 3 is placed into the open first end of a receivor 23. A key portion 600 of the heating chamber (receivor) extends into the receivor causing it to be at least partially non-circular. The key portion physically presses and/or compresses the cartridge tube indenting or shaping a portion of the cartridge and containment end to roughly follow the contour of the shape of the key portion.

Figure 9A:
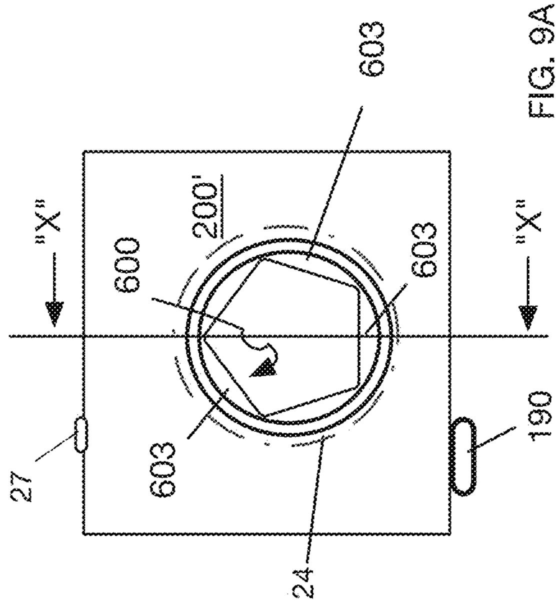
FIG. 9A illustrates aspects of a disposable cartridge and key portion heating chamber.

FIGS. 9A-9F show aspects of the heating system generally described herein utilizing a key portion 600 for cartridge positioning and/or creation of heating zones. FIG. 9A shows a front view of a portable heating system. At the front of the case 200' is the cartridge interface 24 which is fluidly connected to the receivor whereby the cartridge is inserted into the heating chamber 23 and key portion for heating disposable consumables.

Figure 9C:
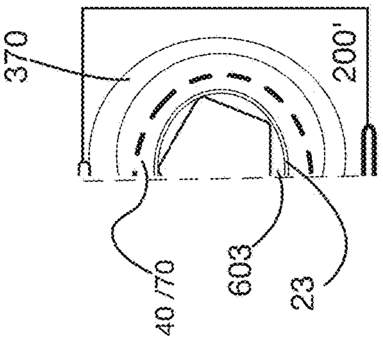
FIGS. 9B to 9E illustrate aspects of a disposable cartridge and key portion chamber of FIG. 9A along the line of "A" to "A".
Figure 9E:
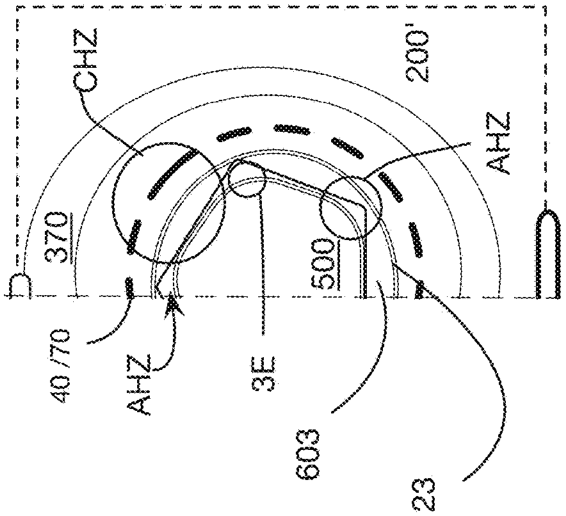
Figure 9B:
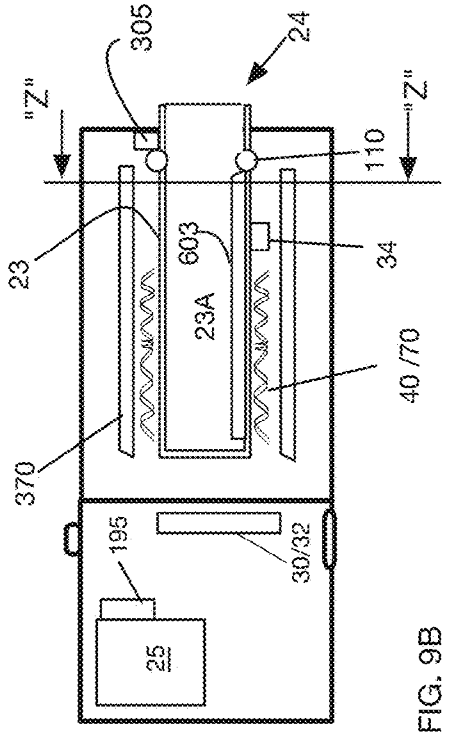
Figure 9D:
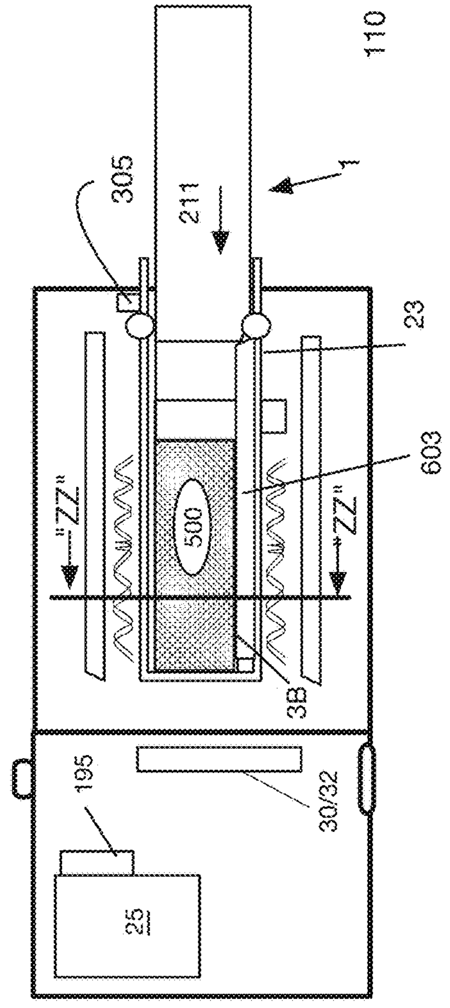

FIG. 9B is a view along the line of "X"-"X" of FIG. 9A. The key portion 600 extends from the receivor forming non circular regions or protrusions 603, heating elements may be one or more heating element encircling at least art of the heating chamber 40 or vertical heating elements 70. FIG. 9C is a cut away view of FIG. 9B along the line "Z"-"Z" showing the key portion receivor. FIG. 9D is another cut-away of FIG. 9A along the line of "X"-"X" but has the disposable consumable cartridge 1 inserted. FIG. 9E is a cut away view of FIG. 9D along the line of "ZZ"-"ZZ" showing the compressing or indenting of the cartridge containment end via passage through the key portion indents sections of the cartridge containment end to fit tightly against the inner wall of the receivor forming Conductive Heat Zones "CHZ" and Air Heating Zones "AHZ". The "CHZ" is a conduction region of heat transfer to the cartridge containment end and material therein when heating is active. The "AHZ" is adjacent to non-indented or unflatten sections 3E of the containment end and is heated by heat transfer through the receivor when heating is active whereby the volume of air in the "AHZ" is heated.

Figure 9F:
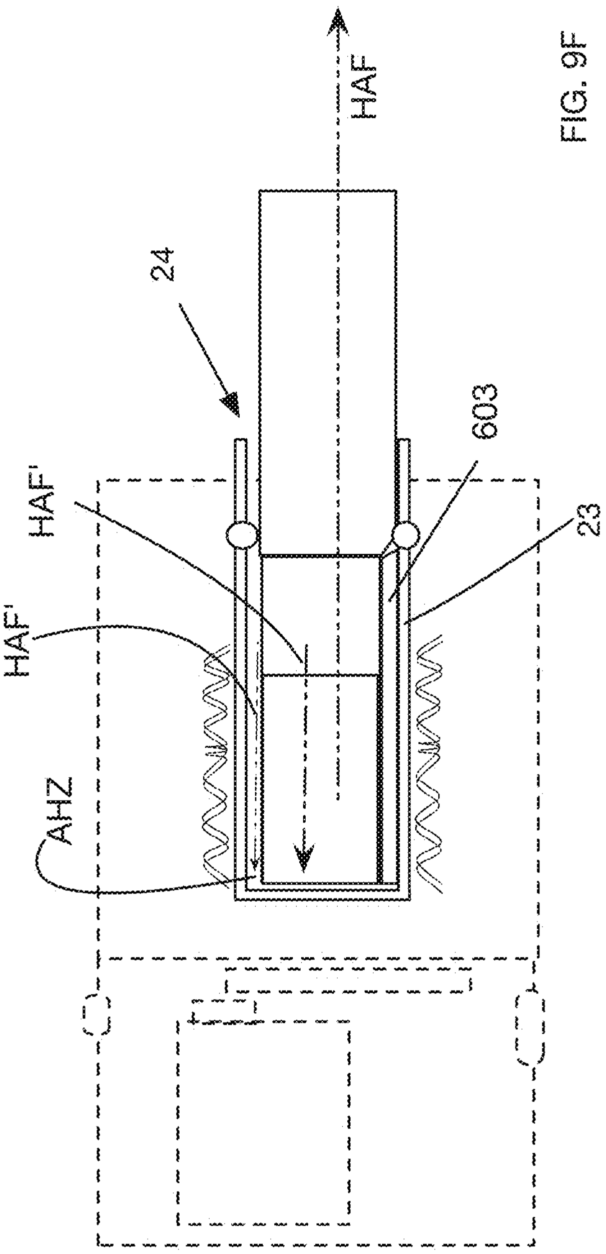
FIG. 9F illustrates a partial view of FIG. 9B showing aspects of a disposable cartridge and key portion heating chamber.

FIG. 9F is a partial view of FIG. 9B illustrating Heated Airflow "HAF" moving within the system. The volume of air heated in AHZ forms at least a portion of the Heated Airflow "HAF". Such Heated Airflow "HAF" moves through the cartridge from containment end to inhalation end along the "HAF" arrow. Vapor absent combustion byproducts is released from the material 500 is carried with the air flow during use (inhalation). The heating at the CHZ also heats the material as part of the vapor, without combustion, process. In some instance vertical heaters 70 are positioned corresponds to the key portions which are configured to indent the cartridge containment end to form CHZ. In some instance vertical heaters are positioned corresponding to the key portions which are configured to form AHZ. In some instance vertical heater positioning corresponds to the key portions which are configured to form one or more CHZs and one or more AHZ. The key portion prevents cartridge rotation about its axis when in the receivor (heating chamber). Limiting rotation of the consumable cartridge around its axis in the receivor aligns or places one or more predefined sections of the containment end second shaped end against regions of the receivor inner wall in predetermined locations. The controller counts and/or controls heating of each vertical heater such that each vertical heater is controlled. In some instance the heater(s) corresponding to one or more CHZ are activated, in other instance the vertical heater(s) corresponding to one or more AHZ are activated. In yet other instances a combination of vertical heaters corresponding to CHZ and AHZ are activated.

Those of ordinary skill in the art will understand that any cartridge with an indented or shaped containment end whereby a portion of the containment end is in direct contact with the inner wall of the receivor and another portion is remote from the inner wall of the receivor is within the scope of this disclosure.

FIG. 10A-E shows aspects of the use of a Key Hole 650 as an alternate shaping means for a cartridge which also forms Conductive Heat Zones (CHZ) and Air Heating Zones (AHZ). A key hole 650 is configured to ident or shape the area of a consumable disposable cartridge passed therethrough.

Figure 10A:
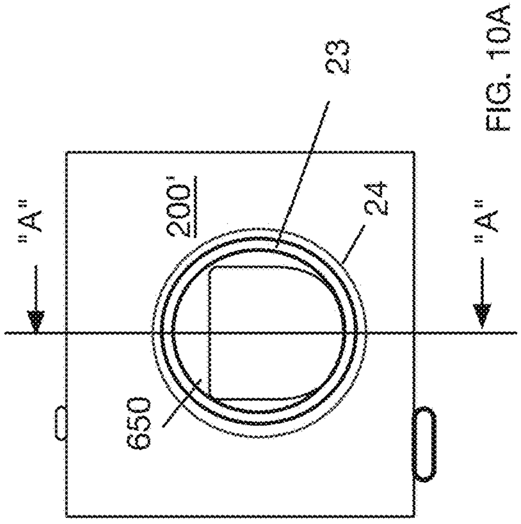
FIGS. 10A to 10E illustrates aspects of a Key Hole heating chamber for a non-combustible consumable cartridge heating system.
Figure 10B:
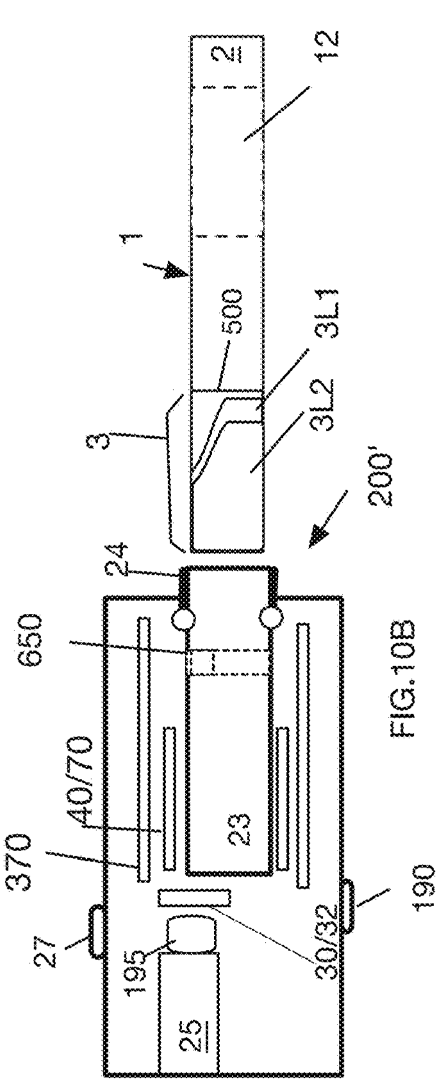

FIG. 10A shows a front view of a portable heating system in a case 200'. A Key Hole 650 is visible inside the heating chamber (receivor) 23 which is fluidly connected to the cartridge interface 24 whereby the cartridge is inserted into the heating chamber 23 and Key Hole for heating disposable consumables cartridges.

Figure 10C:
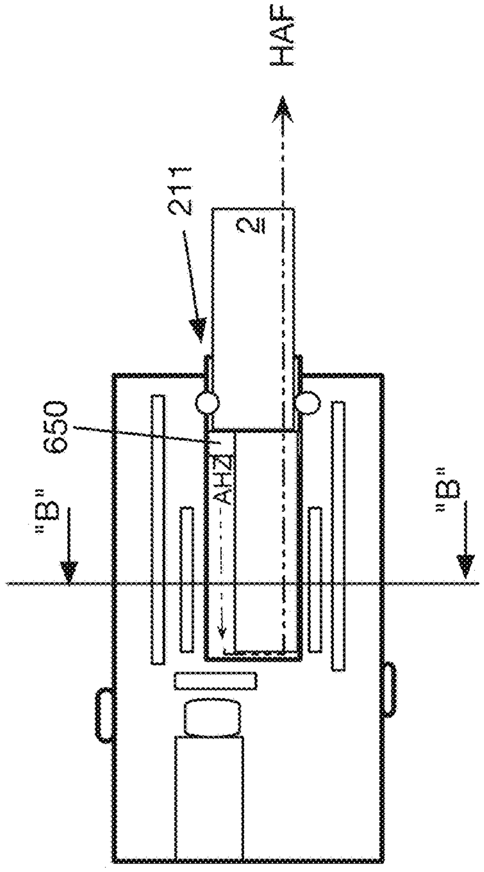
Figure 10D:
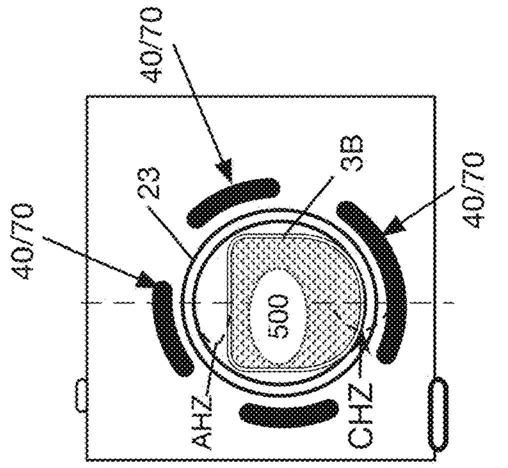

FIG. 10C shows a cartridge 1 within the heating chamber after insertion through the Key Hole 650. The Key Hole is configured to ident sections of the cartridge inserted therethrough thereby both limiting the movement of the cartridge about its axis and positioning sections of the cartridge in predetermined regions of the heating chamber. An Air Heating Zone (AHZ) is shown wherein air heated via heat transferred from heating element(s) by heating chamber 23 travels through the cartridge as a Heated Airflow (HAF) carrying with it vapor released from the material within the containment end of the cartridge. FIG. 10D shows a cut away view from line "B"-"B" of FIG. 10C. It can be seen that sections of the second shape 3B of the containment end are heated conductively at CHZ and air volume in the AHZ is heated by the inner wall of the heating chamber.

Figure 10E:
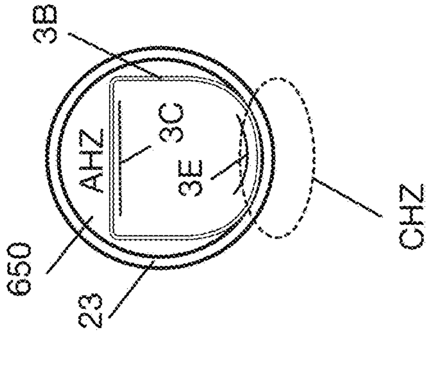

FIG. 10E illustrates that in a Key Hole configuration the section of the cartridge's second shape 3B containment end is indented 3C and remoted from the inner wall and an AHZ with a volume of heatable air is formed between the indented area 3C of the second end and the inner wall. The section of the cartridge's second shape 3B containment end which is not indented 3E is in physical contact with the inner wall rather than being remote from that inner wall (as described in reference to a key portion 600) and it forms a CHZ which heats the containment portion via conduction. The result of the Key Hole passage is the formation of one or more areas of the cartridge is remote from physical contact with the inner wall and one or more areas of the cartridge is in direct physical contact with the inner wall.

Figure 11B:
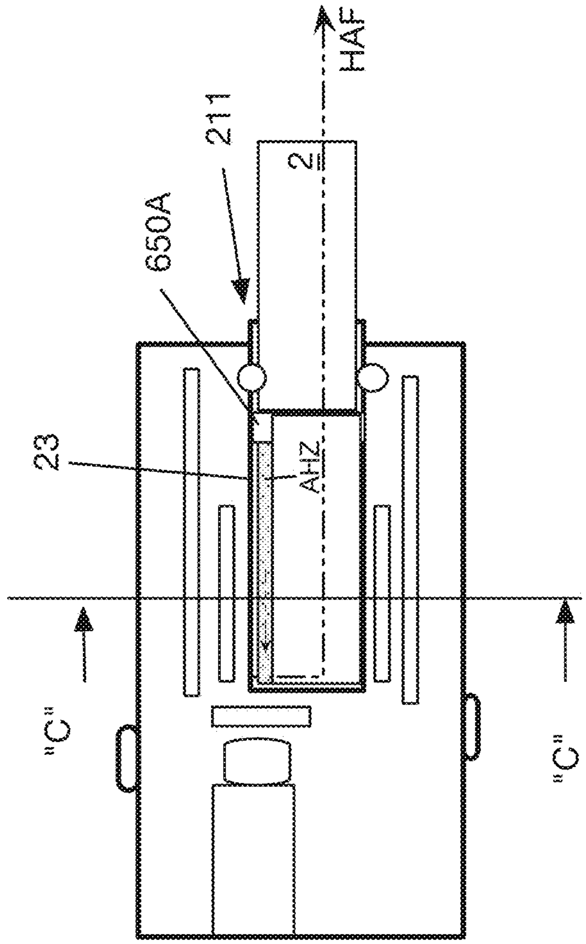
FIGS. 11A and 11C illustrate aspects of another Key Hole and heating chamber.
Figure 11C:
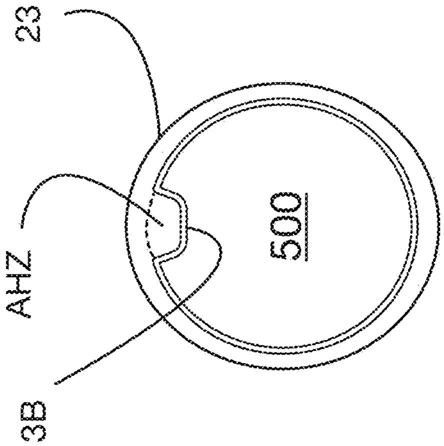
Figure 11A:
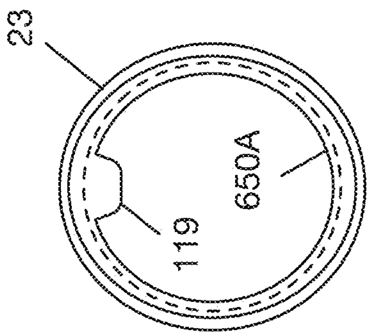

FIGS. 11A through 11C illustrate another Key Hole heating system and another heating chamber Key Hole 650A which compresses at least a portion of the containment end of a consumable cartridge in a heating chamber whereby portions of the containment end are in physical contact with the heating chamber and portions are separated with a air gap in-between the containment end and the heating chamber. One or more Conductive Heat Zones "CHZ" and Air Heating Zones "AHZ" are formed corresponding to the areas of physical contact and the areas where air in the heating chamber (receivor) is heated as described in reference to the aspects of the exemplary implementation(s) described FIGS. 9A to 10E above. Extending inward from the heating chamber 23 thermal (heat) transfer inner wall of the heating chamber (receivor) is a protrusion or divider 119 which provides thermal communication between the heating elements and the interior of the heating chamber. The protrusion has exchange properties and is constructed of a material and in a configuration to facilitate heat transfer. Upon insertion of the containment end of the consumable through the Key Hole 650A, the protrusion 119 indents a section of the consumable forming elongated an Air Heating Zone "AHZ" wherein air will be heated, other portions of the consumable containment end are in physical contact with the heating chamber and form the Conductive Heat Zone(s) "CHZ". FIG. 11C is a cut-away view of FIG. 11B along arrows "C"-"C" showing the protrusion portion of the Key Hole 650A (See FIG. 11A), the Air Heating Zone "AHZ" in the second shape 3B containment end which is formed by passing the consumable through the Key Hole.

Methods disclosed include a controller that manages heating at a selected exposure temperatures (SET) to vaporize a portion of the material in the containment area in the accordance with one of variable, preselected and fixed times. The heating of all heating elements may also be referred to as a cycle or a heating cycle. When a cycle is over the cycle has timed out. Temperature sensors are utilized to measure when the chamber or subzone has reached a target temperature. If the amount of time a specific heating element is to be heated is reached the heating of that element has timed out. The controller can track, monitor, measure or otherwise count that heating time. In other instances the controller may switch between subzones, preferably using a PWM protocol to supply power to each heating element separately to maintain a temperature at a predetermined range. Selective heating allows the "off" zone to cool while the "on" zone is heating. Said cooling is effective to reduce singeing of cannabis material.

In some instances the controller prohibits heating when a zone has already been heated for a predetermined timeframe. In some instances the controller may accept a user over ride to allow reheating of a zone or to heat multiple zones simultaneously.

Figure 12:
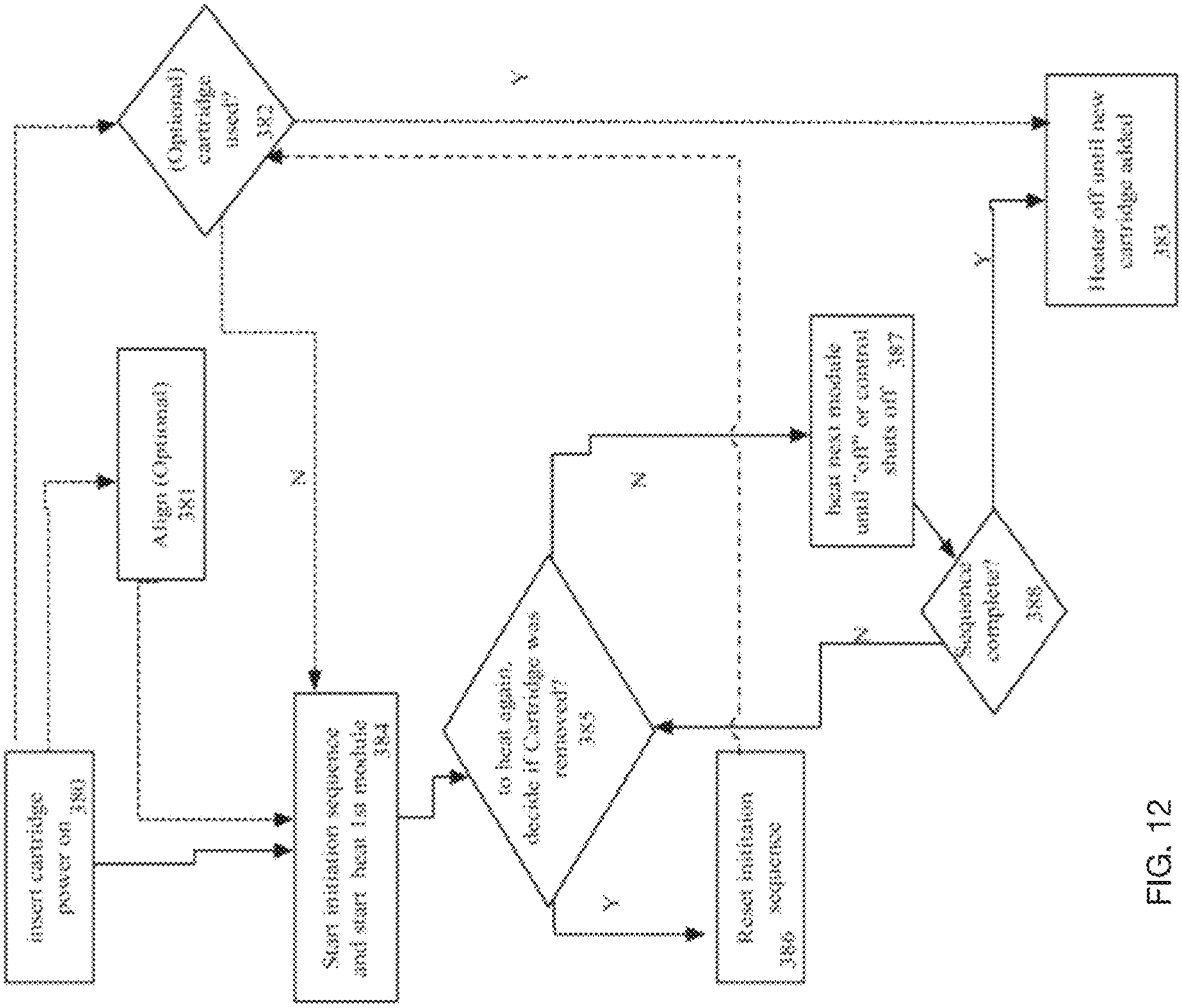
FIGS. 12 to 14 illustrates processes of control of heating for heating a removable non-combustible consumable cartridge.

FIG. 12 illustrates aspects of a control sequence and sequence of operation of one or more exemplary implementations disclosed herein. First a cartridge is inserted into a heater unit and the on/off switch is depressed 380. Optionally, a mechanical, optical, or electro-mechanical fixture limits the orientation of the cartridge to a predefined one 381. Optionally, a sensor collects data on the cartridge to determine if it is used 382. If used 383 keep heater off until a new cartridge is added. If cartridge is not used then start power initiation and heat 1$^{st}$ heating element/module 384 based on at least one of time and/or temperature, until user selects "off" or controller shuts off which may be due to time being completed. Then determine if cartridge has been removed 385. If the cartridge has been removed 386 then rest sequence of operation. If not removed 387 heat next heating element/module until user or controller shuts off. Next determine if sequence of heating is complete 388. The sequence may include heating one or more heating elements multiple times based on one or more of temperature measurements and time. If no heat cartridge if it has not been removed 385, else reset 386. If cartridge heating sequence is complete (all heating zones have been heated) then keep heater off until a new cartridge is provided 383.

FIG. 12 illustrates aspects of a control sequence and sequence of operation of one or more exemplary implementations disclosed herein. First a cartridge is inserted into a heater unit and the on/off switch is depressed 380. Optionally, a sensor collects data on the cartridge to determine if it is used 382. Id used 383 keep heater off until anew cartridge is added. If cartridge is not used then start power initiation and heat heater element 390, heat until user selects "off" or controller shuts off. Determine if cartridge has been removed 392. If removed then rest sequence of operation 393. If not removed determine by position if cartridge has been rotated or slid to a new region 394. If not moved to new zone for heating, then do not heat and optionally warn with indicator, such a light, vibration or audible sound of need to move cartridge 395. If moved then heat until user or controller shuts off 396. Next determine if sequence of heating is complete 397. If no heat cartridge if it has not been removed 392 and if it has been moved 395.

Figure 13:
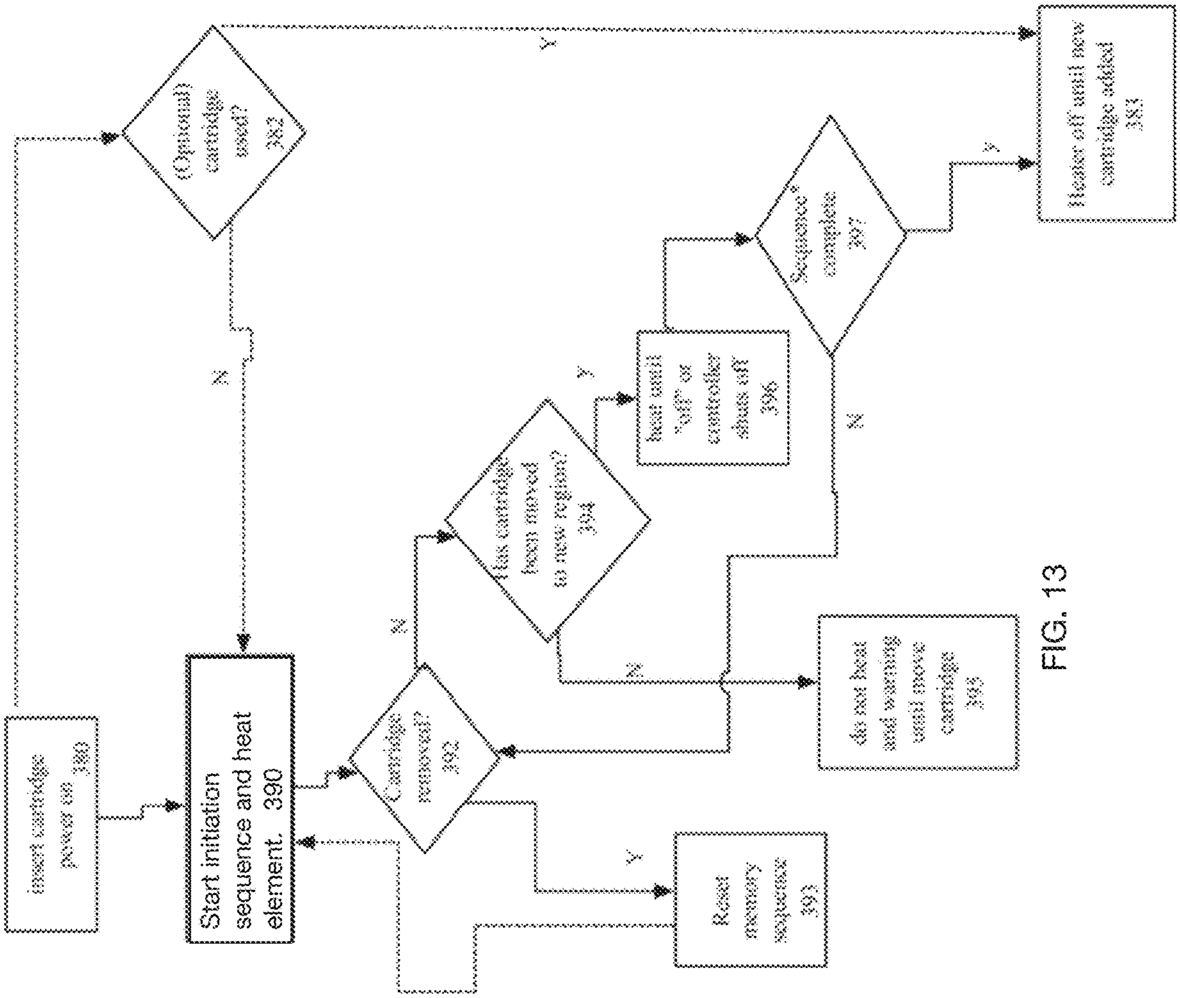
Figure 14:
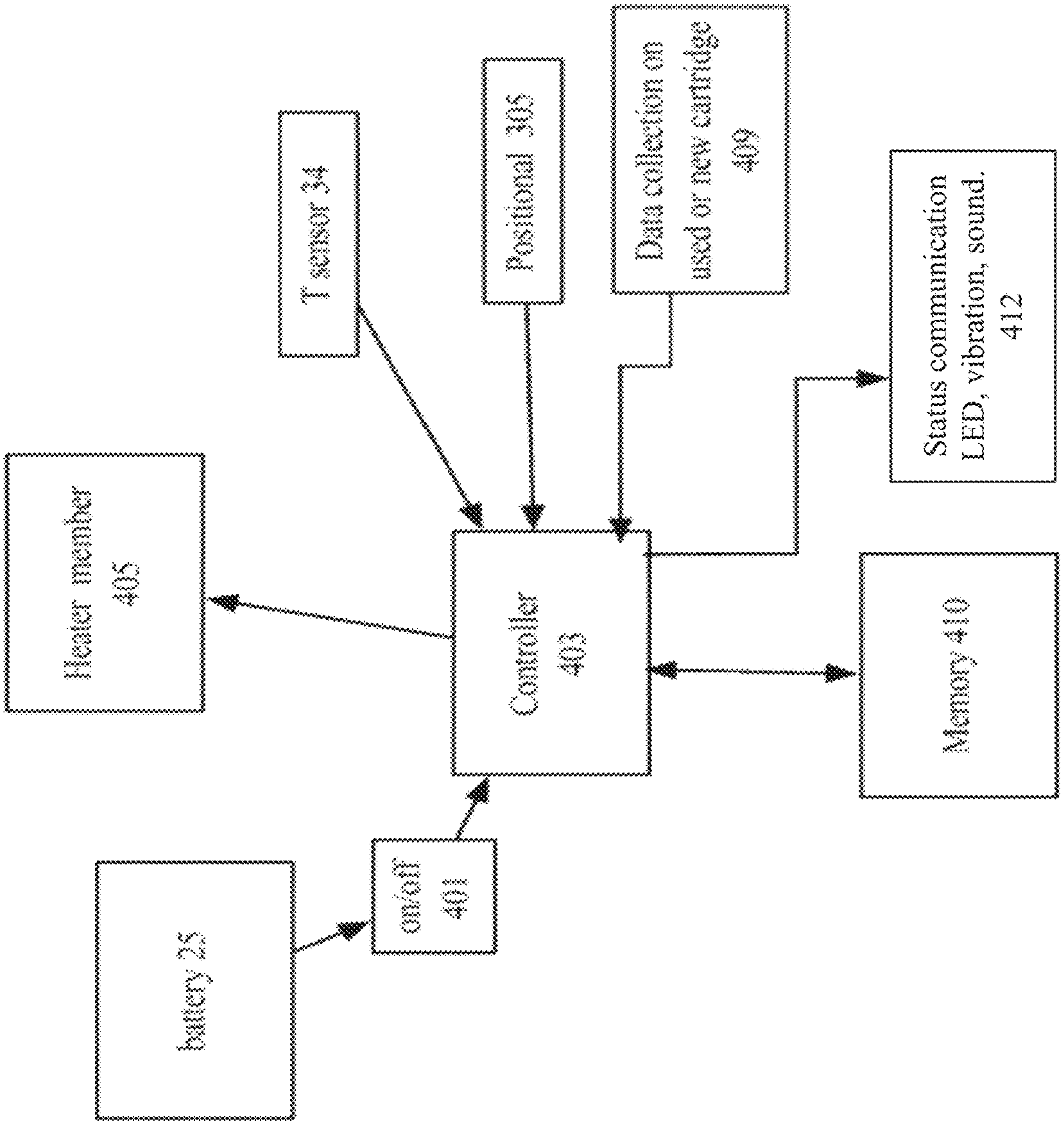

FIG. 13 shows aspects of an operational system for the systems and devices disclosed herein. A battery 25 is conductively connected to an on/off switch 401 then a controller 403. The controller 403 receives input from one or more of temperature sensor 34, positional sensor 305, data collection 409 (such as data on cartridge, RFID on cartridge, optical on cartridge) and communicates with Memory 410 optionally to determine status of cartridge—is it new or used? Has it been moved? Have all heating zones been heated sufficiently? The controller also can provide visual or audio feedback to the user via status indicators 412 such as LED lights, vibration or chirps like sounds from a microprocessor.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A system to heat plant material in a disposable consumable without combustion comprising:

a heating chamber having an open end, a key hole and an inner wall configured to transfer heat therethrough;

a cylindrical consumable cartridge with an inhalation end, and containment end having plant material therein is configured to be inserted into the heating chamber and upon insertion sections of the cartridge indent via the key hole;

in cross section non-indented portions of the cartridge unshaped by the keyhole are in physical contact with the inner wall and at least a portion of indented sections are separated from the inner wall;

the key portion prevents the disposable consumable from rotating about its axis when in the open end;

a volume of air between the indented sections and the inner wall in thermal contact with the inner wall; and wherein inhalation on the inhalation end draws at least the volume of heated air in the heating chamber through the cartridge from containment end to inhalation end.

2. The system to heat plant material in a disposable consumable without combustion of claim 1, further comprising:

one or more heating elements surrounding at least a portion of the heating chamber; and, a controller controls power supplied to the one or more heating elements.

3. The system to heat plant material in a disposable consumable without combustion of claim 1, further comprising one or more conductive layers at the containment end.

4. The system to heat plant material in a disposable consumable without combustion of claim 1 wherein the material is at least one of hemp, cannabis and tobacco.

* * * * *